(12) United States Patent
Klingbeil et al.

(10) Patent No.: US 11,719,154 B2
(45) Date of Patent: Aug. 8, 2023

(54) METHODS AND SYSTEMS FOR MULTI-FUEL ENGINE STARTUP

(71) Applicant: Transportation IP Holdings, LLC, Norwalk, CT (US)

(72) Inventors: Adam Edgar Klingbeil, Ballston Lake, NY (US); Thomas Michael Lavertu, Ballston Lake, NY (US); Eric Dillen, Edinboro, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/455,397

(22) Filed: Nov. 17, 2021

(65) Prior Publication Data

US 2023/0151764 A1 May 18, 2023

(51) Int. Cl.
*F02B 69/04* (2006.01)

(52) U.S. Cl.
CPC ........ *F02B 69/04* (2013.01); *F02B 2201/064* (2013.01)

(58) Field of Classification Search
CPC .. F02D 19/029; F02D 19/0634; F02D 41/061; F02D 41/3863; F02D 41/0025; F02D 41/0027; F02D 41/3035; F02D 41/3064; F02M 37/00; F02M 37/0088; F02B 69/04; F02B 2201/064; B60W 10/14
See application file for complete search history.

(56) References Cited

U.S. PATENT DOCUMENTS

| | | | | |
|---|---|---|---|---|
| 8,516,991 B2* | 8/2013 | Tanno | ................... | F02D 35/028 123/304 |
| 8,600,646 B2* | 12/2013 | Haft | ...................... | F02D 19/084 123/575 |
| 8,903,630 B2* | 12/2014 | Pursifull | ............. | F02D 41/0027 701/107 |
| 11,300,083 B1* | 4/2022 | Dudar | ................ | F02M 37/0064 |
| 2011/0011382 A1* | 1/2011 | Lippa | .................. | F02D 19/0655 123/575 |
| 2011/0288744 A1* | 11/2011 | Gokhale | ............. | F02D 41/0007 701/102 |
| 2015/0377153 A1* | 12/2015 | Gallagher | ............. | F02D 41/021 123/575 |
| 2016/0069291 A1* | 3/2016 | Ge | ........................ | B60W 20/15 701/103 |
| 2016/0169142 A1* | 6/2016 | Klingbeil | ............ | F02D 19/0692 123/435 |
| 2020/0355134 A1* | 11/2020 | Kelly | .................. | F02D 41/0085 |

* cited by examiner

*Primary Examiner* — John Kwon
*Assistant Examiner* — Johnny H Hoang
(74) *Attorney, Agent, or Firm* — McCoy Russell LLP

(57) ABSTRACT

Various methods and systems are provided for engine startup. In one example, a method for an engine includes injecting a fuel mixture with a proportion of a first fuel to a second fuel to decrease carbon emissions, in response to detection of or request for the engine to start. The proportion of the first fuel to the second fuel in the injected fuel mixture is decreased in response to engine speed reaching an idling speed. The first fuel may be a non-hydrocarbon-based fuel and the second fuel may be a hydrocarbon-based fuel.

5 Claims, 7 Drawing Sheets

METHODS AND SYSTEMS FOR MULTI-FUEL ENGINE STARTUP

BACKGROUND

Technical Field

Embodiments of the subject matter disclosed herein relate to a multi-fuel engine system and a method for optimizing engine startup.

Discussion of Art

Vehicles, such as rail vehicles and other off-highway vehicles, may utilize a multi-fuel engine system for propulsion. The multi-fuel engine system may allow vehicle navigation to be driven by torque produced through combustion of more than one type of fuel at an engine. In some examples, the more than one type of fuel may include hydrogen and diesel. Hydrogen may be delivered to the engine in a gaseous phase while diesel may be delivered in a liquid phase. Combustion parameters may vary according to a ratio of hydrogen to diesel injected at the engine due to different physical properties of the fuels. For example, hydrogen may have a higher gravimetric energy density, lower ignition energy, and wider range of flammability than diesel. As such, engine efficiency, power output, and emissions may be affected by co-combustion of hydrogen and diesel.

In particular, engine startup may present challenging conditions for efficient combustion. For example, for a compression ignition engine fueled exclusively by diesel, low engine temperature at startup may cause ignition delays due to difficulties in reaching sufficiently high combustion chamber temperature based on compression of air-diesel mixtures. Poor combustion efficiency and delayed ignition may lead to release of unburned diesel from the engine, in addition to undesirable combustion by-products, such as carbon monoxide (CO), soot, NOx, and particulate matter, especially during initial stages of engine startup where emissions aftertreatment devices may not yet reach their light-off temperatures.

BRIEF DESCRIPTION

In one embodiment, a method for an engine includes injecting a fuel mixture with a proportion of a first fuel to a second fuel to decrease carbon emissions responsive to detection of or request for the engine to start, the first fuel a non-hydrocarbon-based fuel and the second fuel a hydrocarbon-based fuel, and decreasing the proportion of the first fuel to the second fuel in the injected fuel mixture responsive to engine speed reaching an idling speed. In this way, engine startup may be executed in an efficient, robust manner with decreased emissions, regardless of engine temperature at startup.

In one example, a combustion ratio of hydrogen to diesel may be increased during engine startup to expedite warming of the engine and decrease emissions while the engine is still below a threshold temperature. A faster combustion and lower volumetric density of hydrogen relative to diesel may be leveraged to increase combustion efficiency, thereby enabling faster startup with decreased release of unburned diesel. Furthermore, a propensity for hydrogen to burn may allow the engine to be configured, e.g., manufactured, with a lower compression ratio and still be able to start. Upon reaching a threshold engine speed, the combustion ratio, e.g., the ratio of hydrogen to diesel injected at the engine, may be rapidly adjusted to decrease a likelihood of engine knock. Use of additional heating devices, such as heaters and glow plugs, as well as manufacturing constraints imposed on engine compression ratios based on engine cold starts, may be precluded as a result.

DETAILED DESCRIPTION

Figure 1:
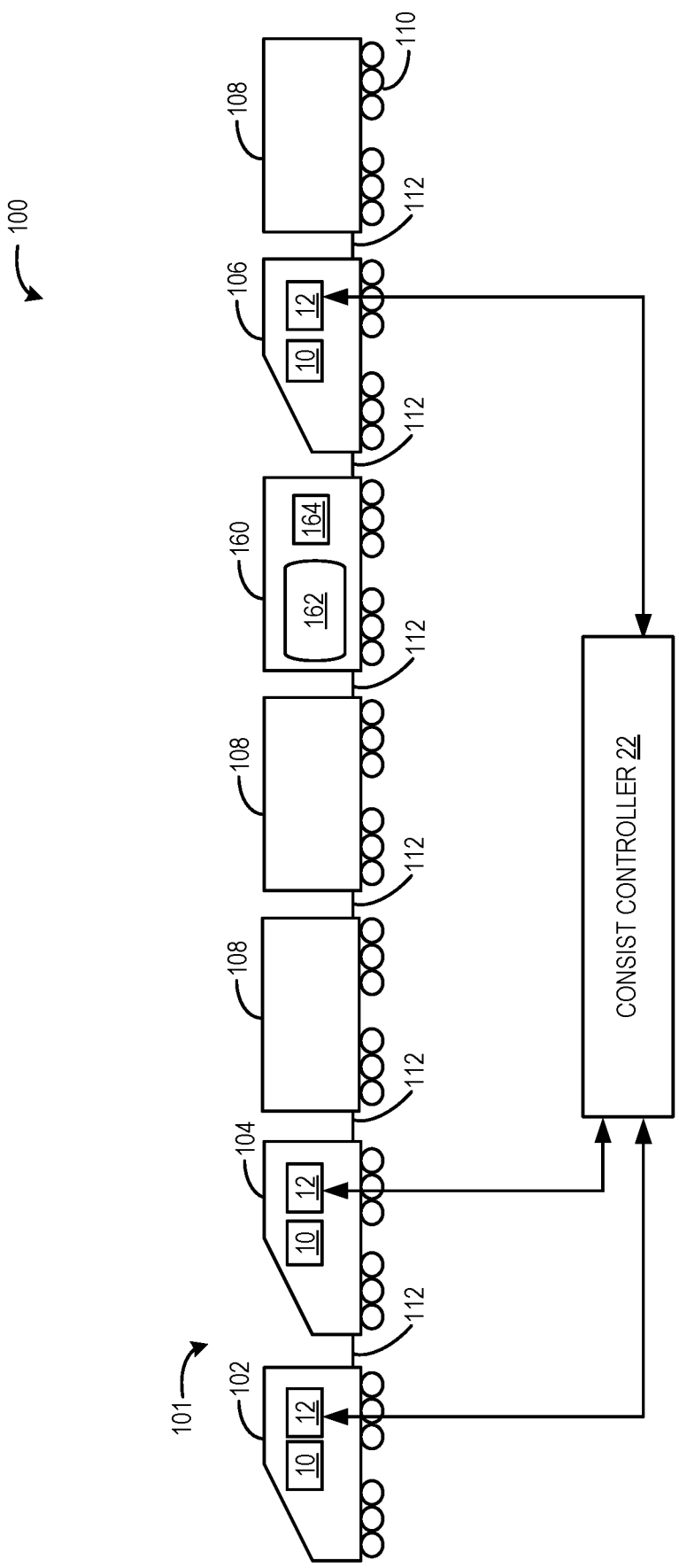
FIG. 1 shows an example embodiment of a train including a locomotive consist.
Figure 2:
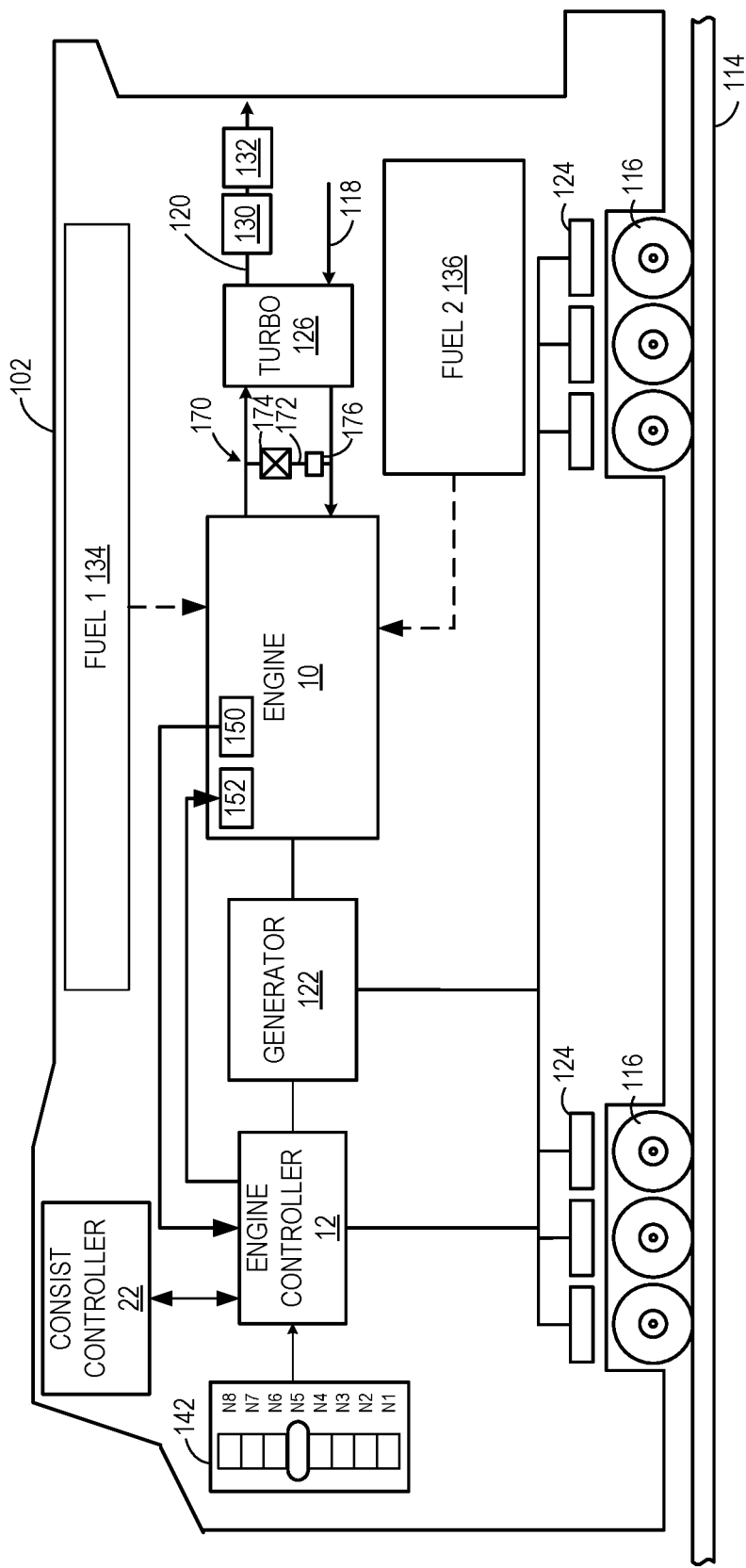
FIG. 2. shows a schematic diagram of an example embodiment of a locomotive from FIG. 1 with a dual fuel engine.
Figure 3:
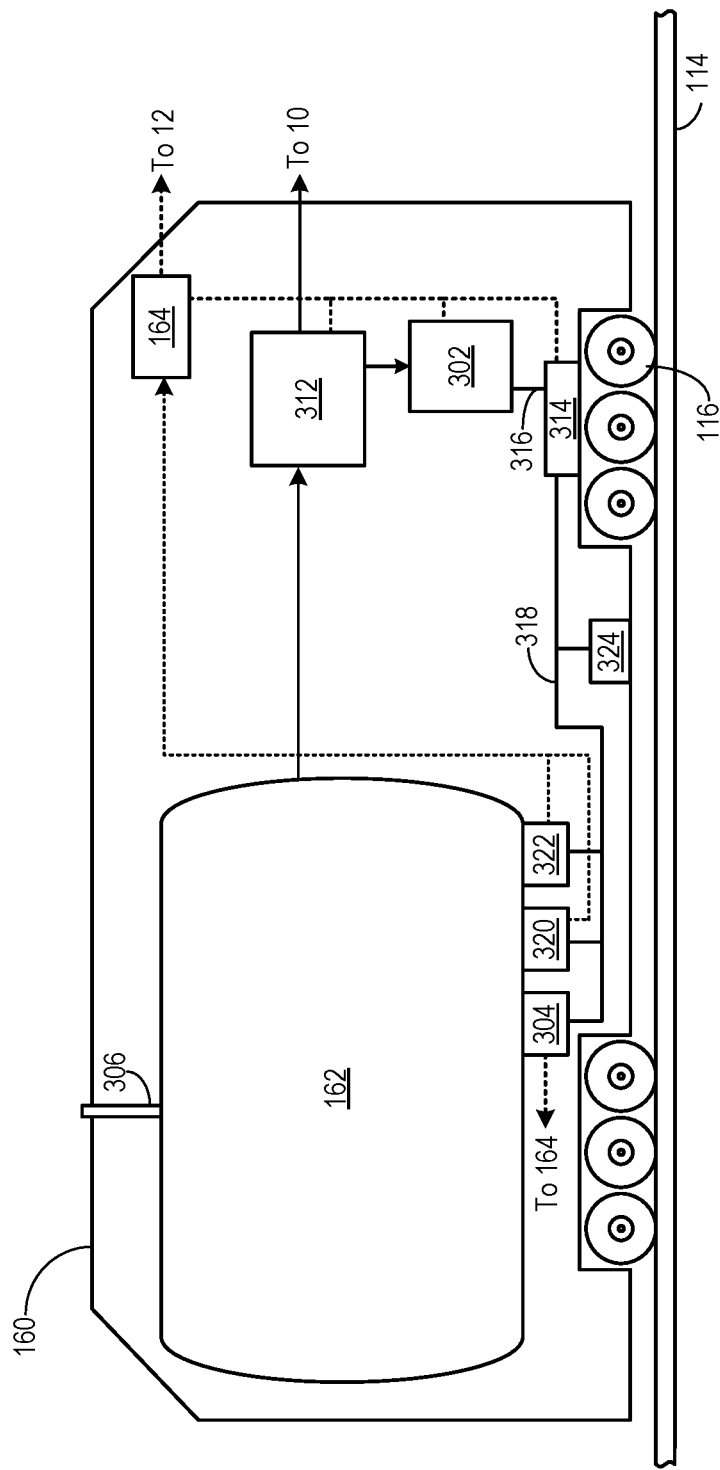
FIG. 3 shows an example embodiment of a fuel tender which may be included in the train of FIG. 1.
Figure 4:
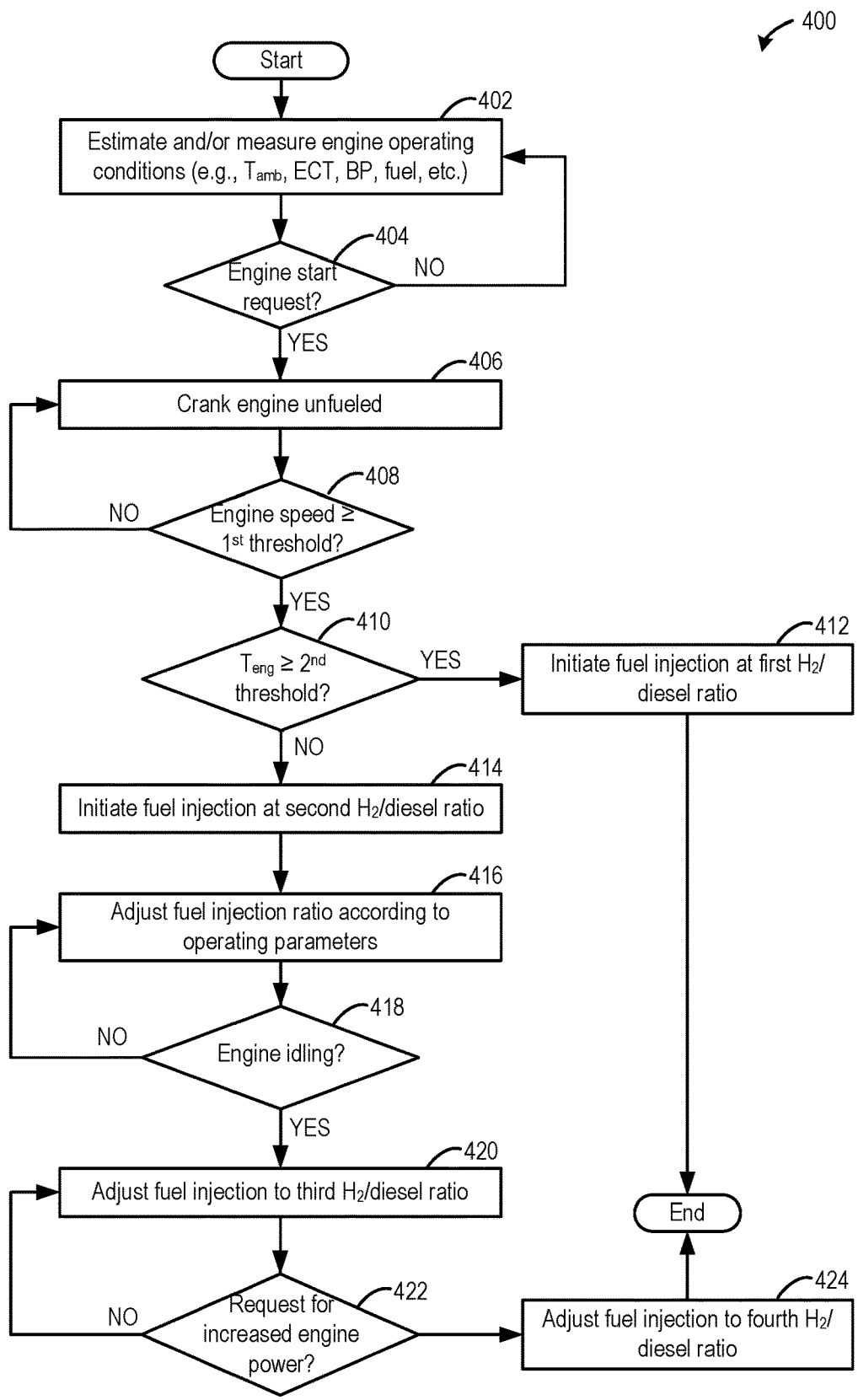
FIG. 4 shows an example of a method for engine startup for the dual fuel engine.
Figure 5:
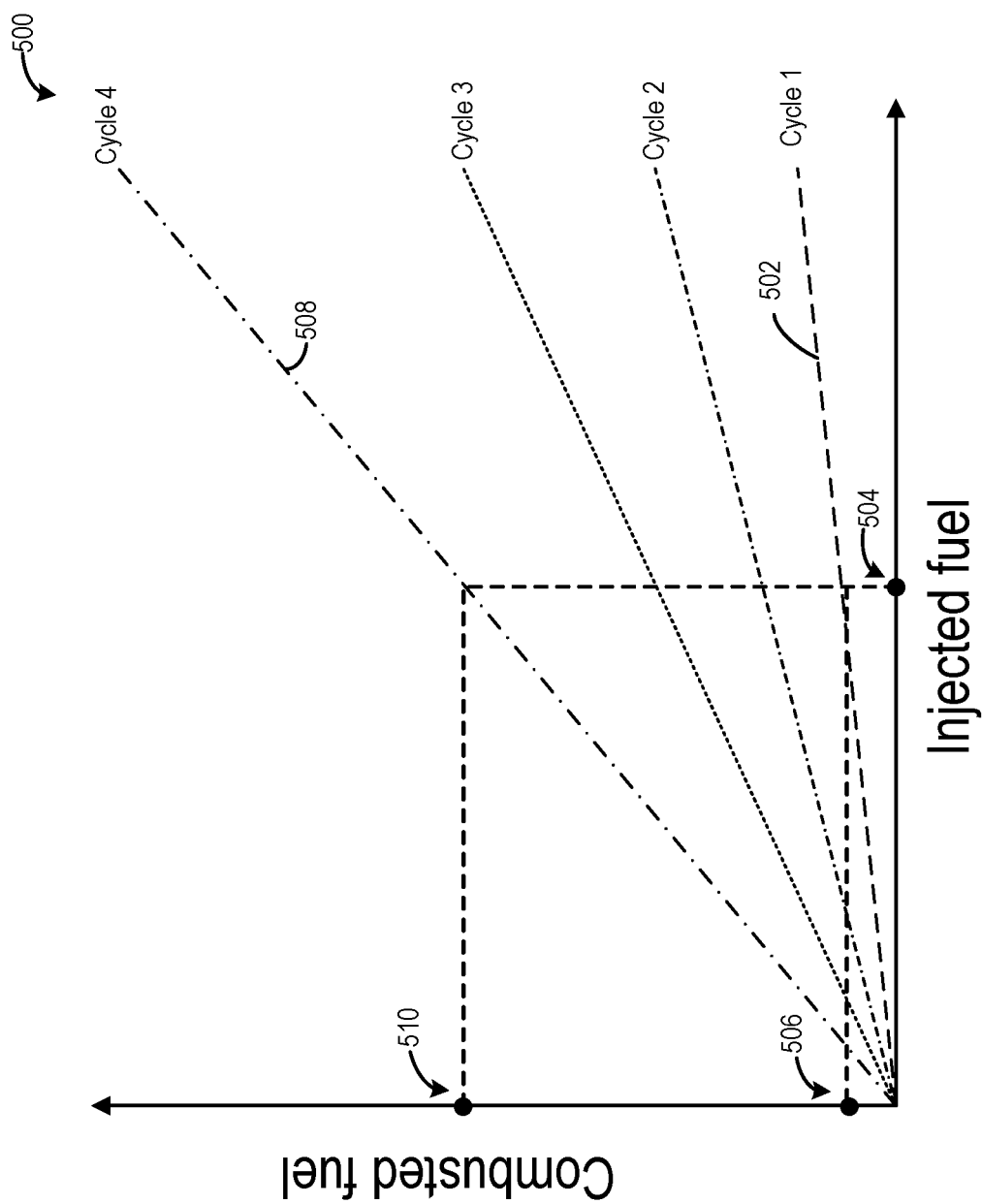
FIG. 5 shows a graph depicting a relationship of between fuel injected at the dual fuel engine and fuel combusted at the dual fuel engine.
Figure 6:
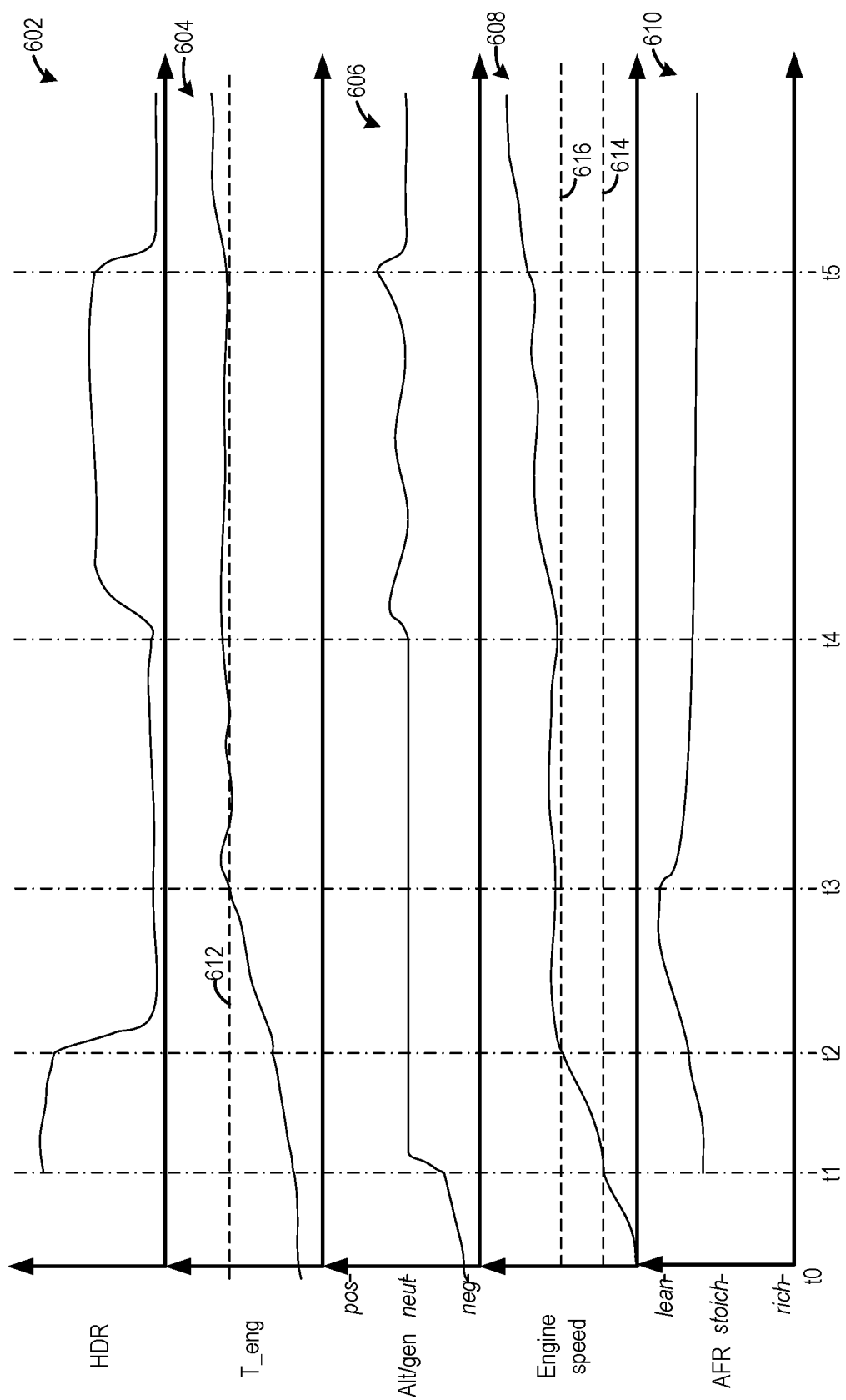
FIG. 6 shows a first graph depicting examples of variations in a first set of operating parameters of the dual fuel engine during a cold start.
Figure 7:
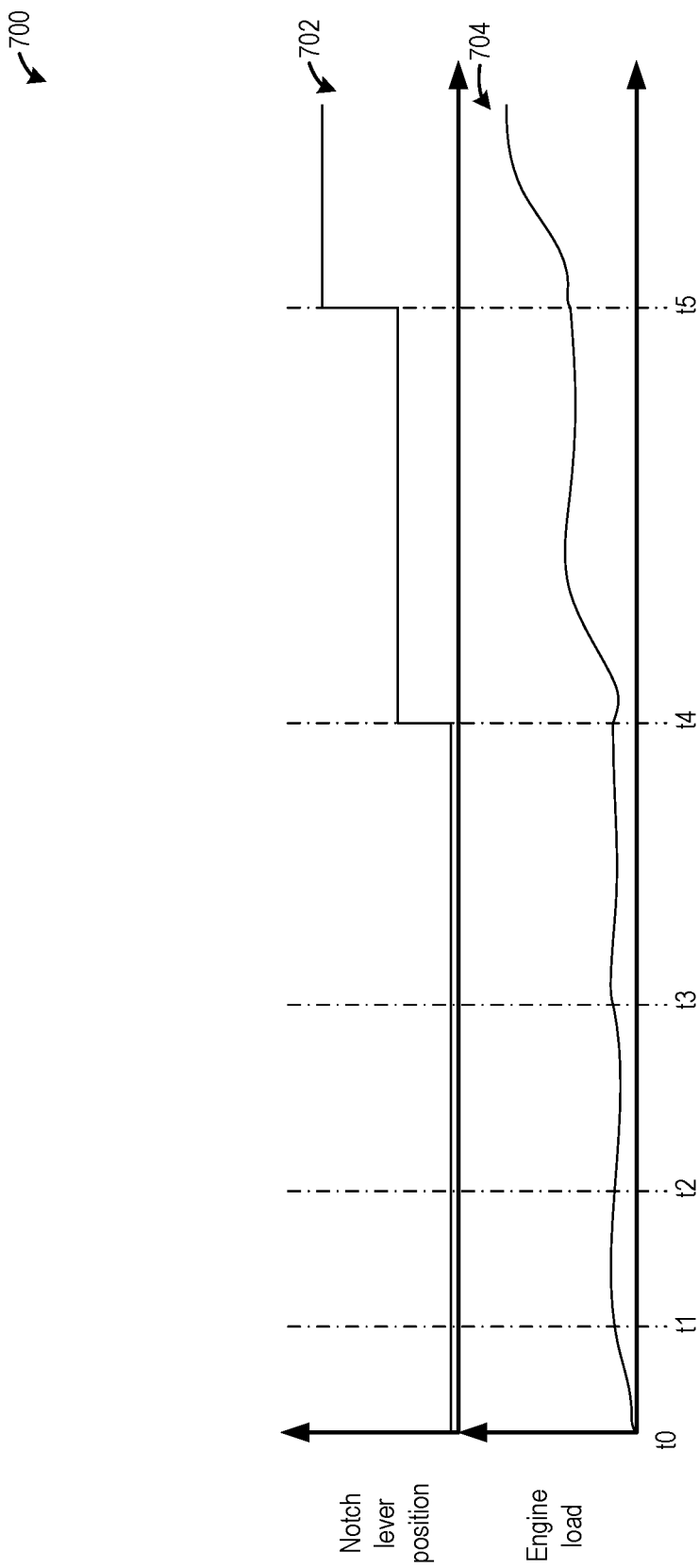
FIG. 7 shows a second graph depicting examples of variations in a second set of operating parameters of the dual fuel engine during the cold start.

The following description relates to a system and methods for engine startup. As one example, the engine system may include a multi-fuel engine configured to combust a first fuel and a second fuel. The first fuel may be a non-carbon emitting fuel, such as hydrogen, and the second fuel may be a hydrocarbon-based fuel, such as diesel. Differences in properties of the fuels may be leveraged to expedite engine startup, particularly during cold starts, to reach stable engine idling conditions rapidly, robustly, and with decreased emissions. The engine system may be included in vehicles of a consist, as depicted in FIG. 1. An example of one of the vehicles adapted with a dual fuel engine is illustrated in FIG. 2 and a fuel tender configured to store one or more fuels combusted by the multi-fuel engine is shown in FIG. 3. During engine startup, a proportion of hydrogen to diesel combusted at the engine may be adjusted to increase combustion efficiency, thereby enabling fast warming of the engine while suppressing release of unburned diesel, and further moderated in response to warming of the engine to mitigate an occurrence of knock. A method for starting the multi-fuel engine is shown in FIG. 4. Transitioning of the fuel mixture between a composition suitable for initial startup and a composition suitable for idling may depend at least in part by a relationship between an amount of fuel injected at the engine and a corresponding amount of fuel that is actually burned. An example of such a relationship is depicted in FIG. 5. Examples of how a hydrogen to diesel ratio of injected fuel, as well as other operating parameters of the multi-fuel engine, are adjusted or varied during a cold engine start are illustrated in FIGS. 6 and 7.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the methods for increasing engine startup efficiency, an example platform in which the methods may be implemented is shown. FIG. 1 depicts an example train 100, including a plurality of rail vehicles 102, 104, 106, a fuel tender 160, and cars 108, configured to run on track 110. The plurality of rail vehicles, the fuel tender, and the cars are coupled to each other through couplers 112. In one example, the plurality of rail vehicles may be locomotives, including a lead locomotive 102 and one or more remote locomotives 104, 106. While the depicted example shows three locomotives, one fuel tender, and four cars, any appropriate number of locomotives, fuel tenders, and cars may be included in the train 100. Further, the locomotives in the train may form a consist. For example, in the embodiment depicted, the locomotives may form consist 101. As illustrated, the train includes one consist. However, any appropriate number and arrangement of consists is within the scope of this disclosure. Furthermore, the consist, while depicted with three locomotives in FIG. 1, may include more or less than three locomotives in other examples.

In some examples, the consist may include successive locomotives, e.g., where the locomotives are arranged sequentially without cars positioned in between. In other examples, as illustrated in FIG. 1, the locomotives may be separated by one or more cars in a configuration enabling distributed power operation. In this configuration, throttle and braking commands may be relayed from the lead locomotive to the remote locomotives by a radio link or physical cable, for example.

The locomotives may be powered by engine 10, while the cars may be non-powered. In one example, the engine may be a dual fuel engine. For example, the engine may be configured to combust hydrogen and diesel, in varying ratios. Further details of the engine are provided further below, with reference to FIG. 2.

The train may further include a control system including at least one engine controller 12 and at least one consist controller 22. As depicted in FIG. 1, each locomotive includes one engine controller, all of which are in communication with the consist controller. The consist controller may be located on one vehicle of the train, such as the lead locomotive, or may be remotely located, for example, at a dispatch center. The consist controller is configured to receive information from, and transmit signals to, each of the locomotives of the consist. For example, the consist controller may receive signals from a variety of sensors on the train and adjust train operations accordingly. The consist controller is also coupled to each engine controller for adjusting engine operations of each locomotive. As elaborated with reference to FIGS. 4-6, each engine controller may determine an engine speed and an exhaust temperature of each engine and, in response to detection of the engine speed being below a threshold speed and/or the exhaust temperature being below a threshold temperature, may adjust a fuel ratio, e.g., of hydrogen to diesel, to expedite engine startup and warming to decrease emissions.

The train may include at least one fuel tender, which may be configured to carry one or more fuel storage reservoirs 162 and includes a controller 164. While the fuel tender is positioned in front of the remote locomotive 106, other examples may include alternate locations of the fuel tender along the train. For example, the fuel tender may be instead positioned behind the remote locomotive or between the lead locomotive and the remote locomotive.

In one example, the fuel tender may be non-powered, e.g., without an engine or electric traction motors (e.g., electric traction motors 124 shown in FIG. 2). However, in other examples, the fuel tender may be powered for propulsion. For example, as shown in FIG. 3, the fuel tender may include an engine (e.g., engine 302 of FIG. 2), which may be similarly configured to the engines of the locomotives, or may have a different configuration. The engine of the fuel tender may combust the fuel stored in the fuel storage reservoir and/or fuel stored at another vehicle of the train.

The one or more fuel storage tanks of the fuel tender may have a suitable structure for storing a specific type of fuel. In one example, the fuel storage reservoir may be adapted for cryogenic storage of liquefied natural gas (LNG). As another example, the fuel storage reservoir may be used to store a fuel in a liquid state at ambient temperature and pressure, such as diesel or ammonia. In yet another example, the fuel storage reservoir may be configured to store a fuel as a compressed gas, such as hydrogen. In each instance, the fuel tender may be equipped with various mechanisms and devices for storage of the particular fuel. Further details of the fuel tender are shown further below, with reference to FIG. 3.

In some examples, fuel may be stored only at the fuel tender. In other examples, however, fuel may be stored both at the fuel tender and at one or more of the locomotives, e.g., as shown in FIG. 2. In addition, in some instances the fuel tender may also be configured to store a fuel cell system, including a fuel cell and one or more tanks of compressed hydrogen gas. Alternatively, the fuel cell system may be stored at one or more of the locomotives.

FIG. 2 depicts an example embodiment of a rail vehicle of the train from FIG. 1, herein depicted as the locomotive 102, configured to run on the track 110 via a plurality of wheels 116. Power for propulsion of the locomotive may supplied at least in part by the engine. The engine receives intake air for combustion from an intake passage 118. The intake passage receives ambient air from an air filter (not shown) that filters air from outside of the locomotive. Exhaust gas resulting from combustion in the engine is supplied to an exhaust passage 120. Exhaust gas flows through the exhaust passage, and out of an exhaust stack (not shown) of the locomotive.

In one embodiment, the engine operates as a compression ignition engine configured to combust at least one type of fuel. In another embodiment, the engine operates as a spark ignition engine similarly configured to combust at least one type of fuel. For example, the engine may combust one specific fuel type only or may be able to combust two or more types of fuel, e.g., a multi-fuel engine. As such, the different fuel types may be combusted individually or co-combusted, e.g., combusted concurrently, at the engine. In one embodiment, the multi-fuel engine may be a dual fuel engine, as depicted in FIG. 2, the dual fuel engine configured to receive a first fuel from a first fuel storage reservoir 134 and a second fuel from a second fuel storage reservoir 136.

While the locomotive is equipped with two fuel storage reservoirs in FIG. 2, in other examples, the locomotive may include only one fuel storage reservoir or no fuel storage reservoir. For example, at least one of the fuel storage reservoirs may be stored at the fuel tender, e.g., the fuel tender 160 of FIG. 1. Alternatively, a third fuel may be stored at the fuel tender in addition to the first fuel at the first fuel storage reservoir 134 and the second fuel at the second fuel storage reservoir 136 of the locomotive. In one example, fuels which may be stored at ambient pressure and temperature without any additional equipment or specialized storage tank configurations, such as diesel, may be stored at the locomotive. Fuels demanding specialized equipment, such as for cryogenic or high pressure storage, may be stored on-board the fuel tender. In other examples, however, the locomotive and the fuel tender may each store fuels that do not demand specialized equipment.

The first, second, and third fuels (e.g., any fuels stored on-board the train) may each be any of a number of different fuel types. For example, the types of fuel may include hydrocarbon-based fuels, such diesel, natural gas, methanol, ethanol, dimethyl ether (DME), etc. The hydrocarbon-based fuels may emit hydrocarbons to the atmosphere when injected at the engine as both combusted fuel and unburned fuel vapor. Alternatively, the fuels may be non-hydrocarbon-based fuels, such as hydrogen, ammonia, etc. The fuels listed above are non-limiting examples of fuels which may be combusted at the engine and various other types of fuels are possible.

Additionally, each of the stored fuels may be a gaseous or a liquid phase fuel. Thus, when configured as a compression ignition engine combusting a single fuel type, the engine may consume a gaseous fuel or a liquid fuel. When the compression ignition engine is a multi-fuel engine, the engine may combust only liquid fuels, only gaseous fuels, or a combination of liquid and gaseous fuels. Similarly, when configured as a spark ignition engine combusting a single fuel type, the engine may also consume either a gaseous fuel or a liquid fuel. When configured as a multi-fuel spark ignition engine, the engine may combust only liquid fuels, only gaseous fuels, or a combination of liquid and gaseous fuels.

As either of the spark ignition or the compression ignition multi-fuel engine configurations, the engine may combust fuel combinations in different manners. For example, one fuel type may be a primary combustion fuel and another fuel type may be a secondary, additive fuel used under certain conditions to adjust combustion characteristics. For example, during engine startup, a fuel combustion mixture may include a smaller proportion of diesel to seed ignition while hydrogen may form a larger proportion of the mixture. In other examples, one fuel may be used for pilot injection prior to injection of the primary combustion fuel.

The engine, as the multi-fuel engine, may be configured to combust various combinations of the fuels and the fuels may be premixed or not premixed prior to combustion. In one example, the first fuel may be hydrogen and the second fuel may be diesel. In another example, the first fuel may be ammonia and the second fuel may be diesel. In yet another example, the first fuel may be ammonia and the second fuel may be ethanol. Further combinations are possible with storage of the third fuel on the fuel tender. For example, LNG may be stored at the fuel tender and the engine may be configured to combust LNG and hydrogen, or LNG, diesel, and hydrogen, or LNG, ammonia, and hydrogen. As such, numerous combinations of fuel types are possible, where the combinations may be determined based on compatibility of the fuels. A method of delivery of the fuels to the engine for combustion may similarly depend on properties of the fuel type.

When the engine is the single fuel-combusting engine (either spark ignition or compression ignition), the engine may consume a single liquid phase fuel. For example, the engine may combust diesel, hydrogen, ammonia, LNG, or another liquid phase fuel. Similarly, the engine may be configured to combust a single gaseous fuel, such as hydrogen, or another gaseous fuel.

Furthermore, a fuel that is stored on-board in one physical state, e.g., gas or liquid, may be delivered to the engine in the same state or a different state. For example, LNG may be stored cryogenically in the liquid phase but may undergo a transition to the gas phase, e.g., at a regasification unit in the fuel tender, prior to injection at the engine. Other fuels, however, may be stored as a liquid and injected as a liquid or stored as a gas and injected as a gas.

Fuels may be injected at the engine according to more than one injection technique, for example. In one example, one or more of the fuels may be delivered to the engine cylinders via an indirect injection method, such as port injection. In another example, at least one of the fuels may be introduced to the engine cylinders via direct injection. In yet another example, at least one of the fuels may be injected by central manifold injection. The engine may be configured to receive the fuels exclusively by indirect injection, exclusively by direct injection, or by a combination of indirect and direct injection. As one example, the fuels may be injected via port injection during low loads and by direct injection during high loads. In particular, when one of the fuels is a gaseous fuel, premixing of the gaseous fuel may be desirable via port injection. The fuels may also be premixed when introduced by central manifold injection. Premixing by direct injection is also possible, such as by injection of the gaseous fuel during an intake stroke of the engine cylinders.

Each type of injection may include injection of either gaseous or liquid phase fuels. However, some injection methods may be more suitable for certain fuels depending on specific properties of the fuel type. For example, hydrogen may be injected by port injection or direct injection. Liquid phase fuels, such as diesel, may be injected by direct injection. Ammonia and natural gas may each be injected by port injection or direct injection. Similarly, fuels such as methanol and ethanol may also be either port injected or direct injected. In some instances, the engine may be configured with fuel injectors capable of switching between injection of gaseous fuels and of liquid fuels.

The fuels combusted by the dual fuel engine, whether in the gas phase or liquid phase, may or may not be premixed prior to combustion. For example, depending on operating conditions, premixing of hydrogen, natural gas, ammonia, methanol, ethanol, and DME may be desirable. During other operating conditions, fuels such as diesel, hydrogen, natural gas, methanol, and ethanol may not be premixed. Premixing of the fuels may include port injection of at least one of the fuels into an inlet manifold or inlet port where the fuel may mix with air before entering a cylinder. As another example, each of the fuels may be port injected, allowing the fuels to mix with one another and with air prior to combustion. In other examples, the fuel(s) may be injected into a pre-combustion chamber fluidically coupled to a cylinder head where the fuel(s) may mix with air in the pre-combustion chamber before flowing to the cylinder head.

Alternatively, as described above, the fuels may be delivered to the engine cylinders by directly injecting one or more fuels into the engine cylinders when the cylinders are filled with at least the compressed air and, in some instances, the gas phase fuel. Direct injection may include high pressure direct injection (HPDI) and low pressure direct injection (LPDI). When direct injected, the fuels may not be premixed, in one example. However, in another example, premixing may be enabled by direct injection of one or more of the fuels prior to a compression stroke of the engine cylinders, as described above.

For embodiments of the engine where the first fuel is hydrogen and the second fuel is diesel, premixing of the hydrogen with air, e.g., for any method of injection, may provide air/fuel mixtures with better combustion stability at low engine speeds, low engine torque, or high total air-to-fuel ratio (AFR), which may result in smoother engine startups. However, at higher engine speeds, higher engine torque, or lower AFR, port injection of the hydrogen may increase a likelihood of engine knock. Direct injection of the hydrogen may mitigate knock. Thus, in some examples, combined application of port injection of hydrogen at low engine speeds/torque and direct injection of hydrogen at high engine speed/torque to mitigate knock may be desirable.

Furthermore, a type of gaseous fuel used may determine whether direct injection of the fuel may include HPDI or LPDI, or both HPDI and LPDI. For example, hydrogen, when stored as a compressed gas, may be injected by HPDI or by LPDI, depending on engine load and available delivery pressure. In particular, HPDI of hydrogen may alleviate knock due to continuous burning of the hydrogen as the hydrogen mixes in the engine cylinders. Furthermore, HPDI may enable greater substitution rates of hydrogen, e.g., substituting for diesel, for example, thereby decreasing hydrocarbon, NOx, and particulate matter emissions during engine operation.

An injection ratio of the fuels for co-combustion may vary according to operating conditions. For example, when the first fuel is hydrogen and the second fuel is diesel, a hydrogen-diesel ratio may be decreased in response to an increase in power demand at the engine. In some instances, the ratio may be adjusted such that only one of the fuels is combusted at the engine. During engine startup, and more specifically, during cold starts, low engine temperatures may result in release of unburned fuel to the atmosphere, thus contributing to hydrocarbon emissions and fuel losses. Modification of the fuel ratio may enable increased fuel efficiency at startup, decreasing hydrocarbon emissions. In one example, when the first fuel and second fuels are hydrogen and diesel, respectively, engine startup may be initiated with a fuel mixture that is predominantly hydrogen. A relatively small amount of diesel may be co-combusted with the hydrogen to seed ignition. Further details of startup at the dual fuel engine are provided below, with reference to FIGS. 4-6.

As shown in FIG. 2, the engine is coupled to an electric power generation system, which includes an alternator/generator 122 and the electric traction motors. For example, the engine generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to the electric traction motors and the alternator/generator may provide electrical power to the electric traction motors. As depicted, the electric traction motors are each connected to one of a plurality of wheels 116 to provide tractive power to propel the locomotive. One example locomotive configuration includes one traction motor per wheel. As depicted herein, six pairs of traction motors correspond to each of six pairs of wheels of the locomotive.

The locomotive may further include a turbocharger 126 arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown) which is at least partially driven by a turbine (not shown). While in this case a single turbocharger is included, the system may include multiple turbine and/or compressor stages. Further, in some embodiments, a wastegate may be provided which allows exhaust gas to bypass the turbocharger. The wastegate may be opened, for example, to divert the exhaust gas flow away from the turbine. In this manner, the rotating speed of the compressor, and thus the boost provided by the turbocharger to the engine may be regulated.

The locomotive further may include an exhaust gas recirculation (EGR) system 170, which routes exhaust gas from the exhaust passage upstream of the turbocharger to the intake passage downstream of the turbocharger. The EGR system includes an EGR passage 172 and an EGR valve 174 for controlling an amount of exhaust gas that is recirculated from the exhaust passage of the engine to the intake passage of the engine. By introducing exhaust gas to the engine, the amount of available oxygen for combustion is decreased, thereby reducing the combustion flame temperatures and reducing the formation of nitrogen oxides (e.g., NOx). The EGR valve may be an on/off valve controlled by the locomotive controller, or it may control a variable amount of EGR, for example.

The EGR system may further include an EGR cooler 176 to reduce the temperature of the exhaust gas before it enters the intake passage. As depicted in the non-limiting example embodiment of FIG. 2, the EGR system is a high-pressure EGR system. In other embodiments, the locomotive may additionally or alternatively include a low-pressure EGR system, routing EGR from a location downstream of the turbocharger to a location upstream of the turbocharger. Additionally, the EGR system may be a donor cylinder EGR system where one or more cylinders provide exhaust gas only to the EGR passage, and then to the intake.

The locomotive may include an exhaust gas treatment system coupled in the exhaust passage to reduce regulated emissions. In one example embodiment, the exhaust gas treatment system may include a diesel oxidation catalyst (DOC) 130 and a diesel particulate filter (DPF) 132. The DOC may oxidize exhaust gas components, thereby decreasing carbon monoxide, hydrocarbons, and particulate matter emissions. The DPF is configured to trap particulates, also known as particulate matter (an example of which is soot), produced during combustion, and may be comprised of ceramic, silicon carbide, or any suitable material. In other embodiments, the exhaust gas treatment system may additionally include a selective catalytic reduction (SCR) catalyst, three-way catalyst, $NO_x$ trap, various other emission control devices or combinations thereof. In some embodiments, the exhaust gas treatment system may be positioned upstream of the turbocharger, while in other embodiments, the exhaust gas treatment system may be positioned downstream of the turbocharger.

The locomotive may further include a throttle 142 coupled to the engine to indicate power levels. In this embodiment, the throttle is depicted as a notch throttle. However, any suitable throttle is within the scope of this disclosure. Each notch of the notch throttle may correspond to a discrete power level. The power level indicates an amount of load, or engine output, placed on the locomotive and controls the speed at which the locomotive will travel. Although eight notch settings are depicted in the example embodiment of FIG. 2, in other embodiments, the throttle notch may have more than eight notches or less than eight notches, as well as notches for idle and dynamic brake modes. In some embodiments, the notch setting may be selected by a human operator of the locomotive. In other embodiments, the consist controller may determine a trip plan (e.g., a trip plan may be generated using trip optimization software, such as Trip Optimizer™ system available from General Electric Company and/or a load distribution plan may be generated using consist optimization software such as Consist Manager™ available from Wabtec) including notch settings based on engine and/or locomotive operating conditions, as will be explained in more detail below.

The engine controller may control various components related to the locomotive. As an example, various components of the locomotive may be coupled to the engine controller via a communication channel or data bus. In one example, the engine controller and the consist controller each include a computer control system. The engine controller 12 consist controller may additionally or alternatively include a memory holding non-transitory computer readable storage media (not shown) including code for enabling on-board monitoring and control of locomotive operation. The engine controller may be coupled to the consist controller, for example, via a digital communication channel or data bus.

Both the engine controller and the consist controller may receive information from a plurality of sensors and may send control signals to a plurality of actuators. The engine controller, while overseeing control and management of the locomotive, may be configured to receive signals from a variety of engine sensors 150, as further elaborated herein, in order to determine operating parameters and operating conditions, and correspondingly adjust various engine actuators 152 to control operation of the locomotive. For example, the engine controller may receive signals from various engine sensors including, but not limited to, engine speed, engine load, intake manifold air pressure, boost pressure, exhaust pressure, ambient pressure, ambient temperature, exhaust temperature, engine temperature, exhaust oxygen levels, etc. Correspondingly, the engine controller may control the locomotive by sending commands to various components such as the electric traction motors, the alternator/generator, cylinder valves, fuel injectors, the notch throttle, etc. Other actuators may be coupled to various locations in the locomotive.

The consist controller may include a communication portion operably coupled to a control signal portion. The communication portion may be configured to receive signals from locomotive sensors including locomotive position sensors (e.g., GPS device), environmental condition sensors (e.g., for sensing altitude, ambient humidity, temperature, and/or barometric pressure, or the like), locomotive coupler force sensors, track grade sensors, locomotive notch sensors, brake position sensors, etc. Various other sensors may be coupled to various locations in the locomotive. The control signal portion may generate control signals to trigger various locomotive actuators. Example locomotive actuators may include air brakes, brake air compressor, traction motors, etc. Other actuators may be coupled to various locations in the locomotive. The consist controller may receive inputs from the various locomotive sensors, process the data, and trigger the locomotive actuators in response to the processed input data based on instruction or code programmed therein corresponding to one or more routines. Further, the consist controller may receive engine data (as determined by the various engine sensors, such as an engine coolant temperature sensor) from the engine controller, process the engine data, determine engine actuator settings, and transfer (e.g., download) instructions or code for triggering the engine actuators based on routines performed by the consist controller back to the engine controller.

For example, the consist controller may determine a trip plan to distribute load amongst all locomotives in the train, based on operating conditions. In some conditions, the consist controller may distribute the load unequally, that is, some locomotives may be operated at a higher power setting, or higher notch throttle setting, than other locomotives. The load distribution may be based on a plurality of factors, such as fuel economy, coupling forces, tunneling operating, grade, etc. In one example, the load distribution may be adapted based on a distribution of the locomotive consist, e.g., a positioning of each of the locomotives of the locomotive consist, across the train. For example, at least one locomotive may be positioned at an end of the train and at least one locomotive may be positioned at a front of the train. The locomotive at the end of the train may be configured to push propulsion of the train and the locomotive at the front of the train may be configured to pull the train, particularly during uphill navigation. As such, a greater load may be placed on the pushing locomotive at the end of the train.

Turning now to FIG. 3, an embodiment of the fuel tender 160 of FIG. 1 is shown. As described above, the fuel tender includes the fuel storage reservoir 162, the controller 164, and the engine 302. The fuel tender may further include a first unit 304, which may be a device for controlling a temperature and pressure within the fuel storage reservoir. For example, when LNG is stored in the fuel storage reservoir, the first unit may be a cryogenic unit. The fuel storage reservoir may have various sizes and configurations, may be removable from the fuel tender, and may be configured to receive fuel from an external refueling station via port 306.

The fuel storage reservoir may supply fuel to a fuel modification unit 312. The fuel modification unit may be configured to adjust a characteristic of the fuel. For example, the fuel may be converted from a liquid phase to a gas phase at the fuel modification unit, such as when the fuel is LNG. As another example, the fuel modification unit may be a pump to adjust a delivery pressure of the fuel when the fuel is stored in the gas phase. In other examples, where fuel modification is not demanded, the fuel modification unit may be omitted. The fuel may be delivered from the fuel modification unit to engines of the locomotives (e.g., the engines 10 of FIGS. 1 and 2).

By supplying fuel from the fuel storage reservoir to the locomotive engines and the engine of the fuel tender, the fuel may be combusted by the engines distributed across the train. In another non-limiting embodiment, the fuel tender engine may be further configured to generate electricity that may be delivered to one or more components on-board the fuel tender and/or on-board the locomotives. In one example, as depicted in FIG. 3, the fuel tender engine may generate torque that is transmitted to a power conversion unit 314 via drive shaft 316. The power conversion unit is configured to convert the torque into electrical energy that is delivered via electrical bus 318 to a variety of downstream electrical components in the fuel tender. Such components may include, but are not limited to, the first unit, the fuel modification unit, the controller, a pressure sensor 320, a temperature sensor 322, batteries 324, various valves, flow meters, additional temperature and pressure sensors, compressors, blowers, radiators, batteries, lights, on-board monitoring systems, displays, climate controls, and the like, some of which are not illustrated in FIG. 3 for brevity. Additionally, electrical energy from the electrical bus may be provided to one or more components of the locomotives.

In one example the power conversion unit includes an alternator (not shown) that is connected in series to one or more rectifiers (not shown) that convert the alternator's AC electrical output to DC electrical power prior to transmission along the electrical bus. Based on the configuration of a downstream electrical component receiving power from the electrical bus, one or more inverters may be configured to invert the electrical power from the electrical bus prior to supplying electrical power to the downstream component. In one example, a single inverter may supply AC electrical power from a DC electrical bus to a plurality of components. In another non-limiting embodiment, each of a plurality of distinct inverters may supply electrical power to a distinct component.

The controller on-board the fuel tender may control various components on-board the fuel tender, such as the fuel modification unit, the fuel tender engine, the power conversion unit, the first unit, control valves, and/or other components on-board the fuel tender, by sending commands to such components. The controller may also monitor fuel tender operating parameters in active operation, idle and shutdown states. Such parameters may include, but are not limited to, the pressure and temperature of the fuel storage reservoir, a pressure and temperature of the fuel modification unit, the fuel tender engine temperature, pressure, and load, compressor pressure, heating fluid temperature and pressure, ambient air temperature, and the like. In one example, computer readable storage media configured in the fuel tender controller may execute code to auto-stop, auto-start, operate and/or tune the engine and the fuel modification unit in response to one or more control system routines. The computer readable storage media may also execute code to transmit to and receive communications from the engine controllers on-board the locomotives.

The fuel tender depicted in FIG. 3 is a non-limiting example of how the fuel tender may be configured. In other examples, the fuel tender may include additional or alternative components. As an example, the fuel tender may further include one or more additional sensors, flow meters, control valves, various other device and mechanisms for controlling fuel delivery and storage conditions, etc.

As described above, during cold engine startup, faster warming and ramping of engine speed and torque may be enabled by adjusting a proportion of fuels combusted at a dual fuel engine. In particular, when a first fuel of the fuels is a non-hydrocarbon fuel, it may be desirable to utilize the first fuel at a large ratio relative to the other fuel(s) during cold startup to minimize unburned hydrocarbon emissions. The emissions may include unburned, vaporized fuel. For example, in a conventional, single-fuel engine configured to combust diesel, engine temperatures may be initially too low to efficiently burn diesel that is injected during startup. Unburned diesel may therefore be released through the engine exhaust and emitted to the atmosphere as vapor.

By substituting at least a portion of an energy content supplied by the injected diesel with the non-hydrocarbon fuel, which may also have a broader ignition temperature range and faster rate of heat release than diesel, engine ramping and warming may be accelerated while decreasing emissions. For example, combustion of hydrogen forms water vapor and when engine temperature is below an ignition temperature of a hydrogen/air mixture in the engine cylinders, unburned hydrogen gas is released through the engine exhaust. Thus, co-combustion of hydrogen with diesel may suppress an amount of unburned diesel and/or diesel combustion by-products released during startup. Furthermore, hydrogen, when delivered to the engine as a gas, has a lower density than diesel. In other words, a quantity of hydrogen occupies a greater volume than a quantity of diesel with an equivalent energy content. Additionally, hydrogen has a high range of combustion compared to diesel and will therefore combust more readily at lower temperatures. Substitution with hydrogen therefore may allow operation with a lower compression ratio, e.g., use of an engine with a lower compression ratio, thereby enabling more robust ignition and startup under cold conditions.

As an example, when engine startup is requested and the engine temperature is detected to be lower than a threshold temperature, e.g., a cold start indicated by an engine temperature lower than an optimal operating temperature, the controller may command cranking of the engine using an alternator/generator, e.g., the alternator/generator 122 of FIG. 2, until the engine speed reaches a speed suitable for fuel injection to be initiated. Upon reaching the speed suitable for fuel injection, which may be a speed that can be sustained exclusively by fuel injection upon fuel light-off, fuel may be injected at the engine at a target, hydrogen-rich ratio. The target ratio may be a desired ratio of hydrogen to diesel that is actually combusted at the engine.

The target ratio of hydrogen to diesel for combustion at startup may include an amount of hydrogen, relative to energy content equivalence, that is at least equal to an amount of diesel. In some examples, the amount of hydrogen may be greater than the amount of diesel. For example, the target ratio of hydrogen to diesel may be 1:1, in one example. In another example, the target ratio of hydrogen to diesel may be as high as 9:1. In yet other examples, the target hydrogen to diesel ratio may be any ratio between 1:1 to 9:1. The target ratio may depend on a configuration of the engine and operating conditions, e.g., compression ratio, engine temperature, ambient temperature, injection method, etc.

An actual amount of hydrogen and diesel that is injected at the engine cylinders may be determined based on the target ratio and estimates of an amount of each of the fuels that may remain unburned during initial cycles of startup. The engine may be operated under lean combustion during startup to enable higher substitution ratios. However, an actual amount of fuel that is combusted may cause a combusted amount of fuel to differ from an injected amount of fuel. An injected ratio, e.g. a ratio of hydrogen to diesel injected during cold startup, may therefore be different from the target ratio. For example, an increased amount of hydrogen may be injected to circumvent overfueling (e.g., by diesel injection) and low combustion efficiency. The increased injection of hydrogen may allow a desired engine power to be attained in spite of partial combustion of the injected hydrogen. The injected ratio may depend on an amount of excess hydrogen that can be tolerated without causing knock, backfire, or excessive efficiency losses from unused fuel.

Engine startup during cold conditions may therefore be executed according to a three-stage process. A first stage of the three-stage process includes cranking the engine using the alternator/generator until an engine parameter, such as engine speed, reaches a magnitude that is estimated to be sustainable by fuel combustion at a given fuel quantity, followed by initiating fuel injection at the given fuel quantity. The given fuel quantity may be determined based on the target ratio, allowing combustion of hydrogen to sustain engine speed and increase engine temperature. A second stage includes rapidly decreasing the hydrogen/diesel ratio when the engine reaches a target idle mode. A third stage includes increasing the hydrogen/diesel ratio when increased power is requested from the engine, leading to operation of the engine at part-load. Further details of engine startup and operation are provided below with reference to FIG. 4.

A method 400 for starting an engine is depicted in FIG. 4. In one example, the engine may be the engine 10 implemented in the vehicle 102 of FIGS. 1 and 2, configured to combust more than one type of fuel, such as hydrogen and diesel. The engine may be a multi-fuel engine, and more specifically, a dual fuel engine. Prior to execution of the method, the engine may be in a deactivated state, e.g., the engine is not combusting fuel. Instructions for carrying out the method may be executed by a controller, such as the engine controller 12 of FIGS. 1 and 2, at each vehicle (e.g., locomotive) equipped with the engine based on instructions stored on a memory of the controller and in conjunction with signals received from sensors of the engine system, such as the sensors described above with reference to FIG. 1. The controller may employ engine actuators of the engine system to adjust engine operation, according to the methods described below.

In some examples, such as shown in FIG. 1, engine startup may be performed at one or more vehicles of a consist. As such, the method may be executed at each of the vehicles, as commanded by the respective engine controller. Depending on a location of each of the vehicles along, for example, a train, the engines may be started concurrently and operating parameters may be adjusted according to specific conditions at each of the engines. In another example, the engines may be started in a staggered manned or only a portion of the engines may be activated. A consist controller, such as the consist controller 22 of FIGS. 1 and 2, may monitor a status of each engine to determine when engine startup is complete. For example, propulsion of the train via the consists may not commence until each engine startup sequence is fully executed and distribution of load amongst the vehicles may be adjusted according to instructions provided by the consist controller. Furthermore, a trip plan may be stored at a memory of the consist controller which may be consulted to determine load distribution as well as fuel usage.

At step 402, the method includes estimating and/or measuring engine operating conditions. For example, data from sensors, such as the sensors 150 of FIG. 2, may be obtained by the engine controller including information regarding an engine coolant temperature (ECT), ambient temperature, barometric pressure, an amount of hydrogen stored on board, an amount of diesel stored on board, as well as various other engine and vehicle parameters.

The method includes confirming if an engine start request is received at step 404. The engine start request may include adjustment of a plurality of switches, dials, valves, levers, etc.

If the engine start request is not received, the method returns to step 402 to continue monitoring engine and vehicle conditions while the engine is inactive. If the engine start request is received, the method proceeds to step 406 to crank the engine without fuel injection at the engine. For example, the engine controller may command activation of an alternator/generator, such as the alternator/generator 122 of FIG. 2. The alternator/generator may operate in an alternator mode, drawing electrical energy from an energy storage device, such as a battery, to output a torque that drives rotation of a crankshaft of the engine. Rotation of the crankshaft may enable piston motion at combustion chambers of the engine.

As the alternator provides torque to crank the engine, engine speed (e.g., crankshaft rotation) increases. At step 408, the method includes determining if the engine speed reaches a first threshold. As one example, the first threshold may be a speed such as 150 rpm, which may be a speed sustainable by fuel combustion under specific conditions, such as an ambient temperature. For example, the first threshold may be a speed estimated to enable a desired air-to-fuel ratio (AFR) at the ambient temperature where a fuel of the desired AFR has a target hydrogen to diesel ratio (HDR), as described further below.

If the engine speed does not reach the first threshold, the method returns to step 406 to continue cranking the engine. The engine controller may command increased torque output from the alternator/generator, e.g., by drawing more electrical energy at the alternator/generator, to further increase the speed of the engine. If the engine speed reaches the first threshold, the method continues to step 410 to compare the engine temperature (e.g., ECT) to a second threshold. For example, the second threshold may be an engine temperature sufficiently high to generate exhaust gases hot enough to enable catalyst light-off at a DOC and/or a DPF, such as the DOC 130 and DPF 132 of FIG. 2. As another example, the second threshold may be an optimal operating temperature of the engine. For example, the optimal operating temperature of the engine may be a temperature at which a viscosity of engine lubricant, e.g., oil, is decreased, thereby allowing the lubricant to effectively lubricate engine components. The optimal operating temperature may also be a temperature at which efficient fuel combustion occurs with a low likelihood of knock as well as a temperature below a range that may cause engine components to expand and seize.

If the engine temperature is equal to or greater than the second threshold, the engine is deemed warm, e.g., not a cold start, and the method proceeds to step 412 to initiate fuel injection at a first HDR, as well as a first AFR. For example, the controller may refer to lookup tables storing relationships between ambient temperature, engine startup temperature, AFR, and HDR. The warm engine start may be associated with high combustion efficiency, e.g., a large portion of injected fuel is combusted, such as at least 98%, with 2% or less of unburned fuel released through the engine exhaust. The AFR may be higher than stoichiometric during the warm engine start.

Fuel, e.g., hydrogen and diesel, may be delivered according to the AFR from one of more fuel storage reservoirs located on-board the vehicle, such as the first fuel storage reservoir 134 and the second fuel storage reservoir 136 of FIG. 1. Additionally or alternatively, the fuel may be supplied from one or more fuel storage reservoirs located on-board a fuel tender, such as the fuel tender 160 of FIGS. 1 and 3. In some examples, the hydrogen may be stored on the fuel tender and the diesel stored on-board the locomotive. In other examples, both fuels may be stored on the locomotive or both fuels may be stored on the fuel tender. The fuel may be flowed to the engine(s) via conduits, passages, valves, etc., adapted for the specific fuel type. Furthermore, for fuels where pressure modification may be desirable, such as hydrogen, the fuel may be passed through a fuel modification unit, such as the fuel modification unit 312 of FIG. 3.

A portion of the diesel, relative to an amount to be injected according to the ambient conditions, such as temperature, pressure, and humidity, may be substituted by hydrogen. For example, a target amount of fuel energy content may be determined based on the ambient conditions according to an energy content of diesel. Depending on the operating conditions a portion of the target amount of fuel energy content may be provided by hydrogen, e.g., the hydrogen substitutes a portion of the diesel, maintaining the overall fuel energy content at the target amount. As an example, 80% of the diesel may be replaced with an amount of hydrogen that provides an equivalent amount of energy provided by the 80% of diesel, where the amount of hydrogen occupies a larger volume than the substituted portion of the diesel. The substituted portion may be less during the warm engine start than for a cold start. In some examples of warm engine startup, the engine may combust diesel exclusively. During warm engine startup, the first HDR may be determined based on the look-up table providing the relationship between engine temperature and HDR. As fuel is combusted and engine speed is driven by fuel combustion, the alternator/generator is de-energized. The method ends.

If the engine temperature is not at least equal to the second threshold, the engine is deemed cold and a procedure for cold start is executed in response to the request for the cold engine start. The cold start procedure includes initiating fuel injection at a second HDR and a second AFR at step 414. As fuel is injected and combusted, providing energy to drive engine rotation, the alternator/generator is de-energized. The second AFR may be a high AFR, e.g., higher than stoichiometry, which may be provided in the lookup table described above, with respect to step 412. For example, the second AFR may reach between 50-120 during idling conditions which may be difficult to monitor. However, when engine load increases, the AFR may fall to between 25-35 which may be detected and monitored, e.g., by exhaust sensors.

The second HDR may be a hydrogen-rich HDR, relative to the first HDR. For example, the second HDR may be from 1:1 up to 9:1. By substituting a large portion of the diesel for hydrogen, less energy for vaporization of diesel in the combustion chambers is demanded. Furthermore, less unburned diesel is released and emitted to the atmosphere. An amount of diesel that is injected along with the hydrogen may provide an ignition kernel or seed to initiate ignition of a hydrogen/diesel mixture injected into the combustion chambers. In one example, the diesel may be premixed with the hydrogen prior to combustion. For example, the hydrogen may be port injected or injected by LPDI. Diesel may be injected late in a cylinder cycle, such as near an end of a compression cycle, as a pilot injection. In another example, the hydrogen and the diesel may both be injected by HPDI, near the end of the compression cycle. Injection of one fuel may occur first and be completed before injection of the other fuel. Other variations in injection of the fuels are possible.

While the target ratio may be a ratio between 1:1 and 9:1, an actual, injected ratio may differ from the target ratio. For example, lookup tables may be stored in the engine controller's memory mapping relationships between engine temperature, an amount of fuel injected, and an estimated portion of the injected fuel that remains unburned according to the engine temperature.

An example of a relationship between injected fuel and combusted fuel is shown in graph 500 of FIG. 5. The graph includes an amount of injected fuel along the abscissa and an amount of combusted fuel along the ordinate, where the fuel may be hydrogen. The graph indicates the relationship at a specific engine temperature identified as a cold start temperature, such as ambient temperature.

In addition, plots are shown for sequential cycles of the engine. As the cycle number increases, engine temperature and speed may increase, thereby increasing combustion efficiency. For example, at a first plot 502, representing a first engine cycle, engine temperature may be low, e.g., at ambient temperature. An amount of fuel injected during the first cycle is indicated by a first point 504 and corresponding amount of combusted fuel is indicated by a second point 506. A value of the first point, which may be a volume or an energy content of the injected hydrogen, may be greater than a value of the second point, which may similarly be a volume or an energy content of the combusted hydrogen. In other words, an amount of fuel injected exceeds an amount of fuel combusted, with respect to energy content or volume. Thus, while the target ratio of injected fuel may be selected for enrichment, the actual combusted AFR may be more lean than the target ratio. A discrepancy, e.g., a fuel shortfall, between the target ratio and the actual combusted ratio may be compensated for by increasing the amount of injected fuel, e.g., increasing the amount of hydrogen relative to diesel, to achieve an amount of combusted fuel that is closer to the target AFR.

Compensation for a fuel shortfall may change as the engine continues cycling and warms. For example, by a fourth engine cycle, as represented by plot 508, the amount of injected fuel indicated by the first point may be similar to an amount of combusted fuel indicated by a third point 510. The injected AFR may therefore be similar to the target AFR and compensation for the fuel shortfall is no longer demanded. Thus, at step 416 of the method of FIG. 4, the amount of fuel injected is adjusted according to cycle based on estimations of how much of the injected fuel is actually combusted during each cycle. In addition, the amount of fuel injected may increase based on an actual engine speed compared to a target engine speed. For example, during startup, a starting engine speed may be 150 rpm and a target idle speed may be 300 rpm. In order to increase the starting engine speed to the target idle speed, more fuel may be injected.

Additionally, an amount of injected hydrogen, relative to diesel, may be decreased with each sequential engine cycle due to a pressure tolerance of the combustion chambers. For example, an amount of hydrogen substituting for diesel may correspond to an energy content equivalency between hydrogen and diesel. An amount of energy provided by the fuel mixture may be equivalent to an amount of energy provided by diesel without hydrogen substitution. However, for a 7:3 HDR, for example, 70% of the energy content is supplied by hydrogen and the remaining 30% by diesel. Hydrogen, with lower minimum ignition energy in air than diesel, may be more prone to auto-ignition, pre-ignition, and knock, which may be mitigated by decreasing the amount of injected hydrogen as engine temperature rises when the hydrogen is pre-mixed. Decreasing the amount of injected hydrogen may address increases in peak combustion pressure. If the hydrogen is injected by HPDI, however, injected of the hydrogen may be adjusted to a slower injection rate or to a timing occurring later in the cylinder cycle to mitigate excessive peak combustion pressure.

Returning to FIG. 4, at step 418, the method includes confirming if the engine reaches an idling speed, e.g., a speed suitable for an idling mode of the engine. The engine may reach an idling speed when engine speed is at 400 rpm, for example. As another example, the idling speed may be between 300-350 rpm. However, in other examples, the idling speed may be a speed between 250 and 450 rpm. In one example, idling of the engine may be confirmed based on engine speed, e.g., as measured by a Hall effect sensor. The idling speed may be a set engine speed and upon reaching the idling speed, the engine speed may be maintained at the idling speed until a request for a change in power and tractive effort is detected (or a request for engine shutdown).

In another example, engine idling may be confirmed based on engine temperature (e.g., ECT), an engine block temperature, engine oil temperature, or exhaust temperature. For example, after the engine temperature reaches a threshold temperature, e.g., a third threshold which may be a temperature greater than an initial engine temperature upon startup and the optimal operating temperature of the engine, an increase in engine temperature to the third threshold may indicate that the engine has sufficient rotational inertia to continue at a current engine speed with a leaner AFR. In one example, the third threshold may be a temperature at which the amount of combusted fuel is similar to the amount of injected fuel, e.g., as depicted by plot 508 of FIG. 5. Furthermore, the third threshold temperature may be a boundary at which switching to the leaner AFR allows the engine to reach the optimal operating temperature and not rise beyond the optimal operating temperature.

The exhaust temperature may be monitored in a similar manner as described above for the engine temperature. For example, the exhaust temperature may be compared to a threshold temperature, e.g., a fourth threshold, which may be indicative of an engine temperature higher than the initial engine temperature and lower than the optimal operating temperature of the engine. The fourth threshold may also be an exhaust temperature corresponding to when the amount of combusted fuel is similar to the amount of injected fuel, e.g., as depicted by plot 508 of FIG. 5. Additionally or alternatively, the fourth threshold may define an exhaust temperature at which adjusting the AFR and HDR allows the engine to reach the optimal operating temperature without surpassing the optimal operating temperature.

In yet another example, engine idle may be confirmed based on a period of time elapsed since fuel injection was initiated. For example, the period of time may be based on a lookup table or map providing information and relationships between engine cycle number, combusted fuel relative to injected fuel (e.g., as shown in FIG. 5), as well as cycle time. The lookup table or map may provide data indicating a duration of time for the engine to operate through sufficient cycles for the amount of combusted fuel to approach the amount of the corresponding injected fuel (e.g., as depicted by plot 508 of FIG. 5).

If the engine is not confirmed to be idling at step 418, the method returns to step 416 to continue adjusting the AFR and the HDR according to engine cycle, engine temperature, exhaust temperature, time, etc. If the engine is confirmed to reach idle speed, the method proceeds to step 420 to adjust the HDR to a third HDR.

Adjusting the HDR may include decreasing the HDR to a ratio that is suitable for maintaining the engine at the idle speed and allowing the engine temperature to reach and stabilize at the optimal operating temperature. In one example, the third HDR may be similar to the first HDR. For example, in order to decrease a likelihood of knock, stabilize the engine temperature at the optimal operating temperature (once the engine temperature reaches the optimal operating temperature), and to mitigate increased generation of NOx resulting from a high flame temperature of hydrogen, the HDR may be decreased relative to the second HDR such that a proportion of injected diesel is greater than a proportion of injected hydrogen. In some examples, the HDR may be decreased to no hydrogen injection, and diesel is injected exclusively. Furthermore, the AFR may adjusted to a leaner mixture.

At step 422, the method includes confirming if a request for increased engine power is received. For example, the request may be indicated by an increase in the notch lever setting, e.g., as adjusted by an operator. The operator may request the increase in engine power to enable acceleration of the vehicle from standstill by adjusting the notch lever setting to a setting corresponding to operation of the engine at part-load.

If the request for increased engine power is not received, the method returns to step 420 to continue injecting fuel at the third HDR. If the request is received, the method continues to step 424 to adjust injection at the engine to a fourth HDR. The fourth HDR may be higher than the third HDR but lower than the second HDR. By increasing the HDR relative to the third HDR, increased substitution of diesel by hydrogen is enabled, thereby decreasing emissions associated with diesel combustion (e.g., carbon, particulate matter). Increasing hydrogen substitution during part-load, compared to similar substitution during high engine loads, may allow more hydrogen to be combusted without increasing a likelihood of auto-ignition and pre-ignition while mitigating generation of NOx. The method ends.

By decreasing the HDR when the engine reaches an idling state, the engine is able to respond efficiently to a demand for increased torque and vehicle motion. At high loads, combustion at low HDRs, or with only diesel, may be desirable for maximum power output from the engine. During engine operation at moderate loads, however, substitution of at least a portion of the injected fuel may enable diesel combustion by-products to be decreased while meeting power demands.

Injection of a high HDR (e.g., relative to an HDR for engine operation at part- and high loads) during engine startup may appear to exacerbate a possibility of knock. However, particularly for cold engine starts, artificially low engine temperature may be combined with the fast heat release and high diffusibility of hydrogen to effect faster, more efficient combustion relative to startup with diesel. By rapidly adjusting the HDR when the engine reaches idle, high combustion temperatures and in-cylinder pressure leading to auto-ignition and pre-ignition when the engine is subsequently operated at high torque and/or power, may be circumvented. A transition of the HDR to a lower value when the engine reaches idle may be dependent on ambient conditions. For example, when ambient temperature is high, the transition may occur at a lower engine power.

Examples of variations in engine operating parameters during an engine cold start for a vehicle are depicted in graph 600 of FIG. 6 and graph 700 of FIG. 7. The engine may be the engine 10 of FIGS. 1 and 2, coupled to an alternator/generator, such as the alternator/generator 122 of FIG. 2. The engine may be configured to receive hydrogen from a first fuel storage reservoir and diesel from a second fuel storage reservoir, where one or more of the first and second fuel storage reservoirs may be located on-board the vehicle or on-board a different vehicle, such as a fuel tender. As described above, the hydrogen and the diesel may each be injected by direct injection, port injection, or central manifold injection. Furthermore, the hydrogen and diesel may be pre-mixed or not pre-mixed.

Graph 600 depicts a first plot 602 representing a HDR injected at the engine cylinders, a second plot 604 representing engine temperature, a third plot 606 indicating a status of the alternator/generator, a fourth plot 608 depicting engine speed, and a fifth plot 610 representing an AFR at the engine. Graph 700 depicts a sixth plot 702, representing a position of a notch lever of a notch throttle, and a seventh plot 704, illustrating engine load.

Time is plotted increasing to the right along the abscissa for both graph 600 and graph 700 and events of significance are indicated. The same time scale and indicators for events are used for graphs 600 and 700. For the first plot 602, the HDR increases upwards along the ordinate. Similarly, for the second plot 604 and the fourth plot 608, engine temperature and engine speed also increase upwards along the ordinate, respectively. For the third plot 606, the status of the alternator/generator may vary between operating in a generator mode (neg), where the alternator/generator is consuming electrical energy and converting the electrical energy into mechanical energy to drive engine rotation, an alternator mode (pos), where the alternator/generator is converting mechanical energy from the engine into electrical energy, and a neutral mode (neut) where the alternator/generator is neither consuming or generating energy. For the fifth plot 610, the AFR may be stoichiometric, becoming more lean upwards from stoichiometry along the ordinate, or becoming more rich downwards from stoichiometry along the ordinate. Operation of the engine may demand predominantly lean conditions, therefore, the AFR remains above stoichiometry in the fifth plot 610. For the sixth plot 702, notch lever position increases incrementally upwards along the ordinate. As the notch lever position increases, more power is requested of the engine. Engine load at the seventh plot 704 also increases upwards along the ordinate.

The second plot 604 includes a first threshold 612 which is an optimal operating temperature of the engine. The fourth plot 608 includes a second threshold 614 and a third threshold 616. The second threshold may be an engine speed that is sustainable by fuel injection, allowing a load driving engine rotation to be transferred from the alternator/generator to combustion at the engine. The third threshold 616 may be an engine speed at which the engine reaches idle.

At t0, the engine is off, e.g., deactivated and stationary. As no fuel is injected, the engine does not have an AFR or HDR. A request for engine startup is received and the alternator/generator is energized to operate in the generator mode, thereby cranking the engine. Engine speed increases but engine temperature remains low, e.g., below the first threshold 612, between t0 and t1. The notch lever position is at a lowest setting, such as notch 1 and the engine load is low.

At t1, the engine speed reaches the second threshold 614. The alternator/generator is de-energized as fuel injection commences. Fuel is injected with hydrogen as the predominant combustion fuel and with diesel as an ignition assistant. The HDR is high, e.g., between 1:1 and 9:1 and is adjusted according to the engine temperature, e.g., the HDR is decreased as engine temperature increases. The fuel, e.g., a mixture of hydrogen and diesel, is injected at the engine cylinders at a lean AFR. The notch lever remains at the lowest setting and the engine load remains low.

The engine speed, driven by fuel combustion, continues to increase and reaches the third threshold 616 at t2. After t2, the engine speed remains relatively uniform above the third threshold 616. The engine temperature continues to increase from t1 to t3 and the HDR is decreased. After t2, the HDR is low with little to no hydrogen injected as the engine idles and the AFR increases. The alternator generator remains in the neutral mode after t1. The notch lever remains at the lowest setting and the engine load remains low.

At t3, the engine temperature reaches the first threshold 612, e.g., the temperature reaches the optimal operating temperature, and remains relatively stable until t5. Fuel injection is adjusted to become less lean after t3, allowing the engine to idle at the optimal operating temperature and lean AFR. The notch lever position remains at the lowest setting and the engine load remains low until, at t4, the notch lever is adjusted to a higher position, such as notch 3, indicating a request to propel the vehicle at mid-power.

The HDR is adjusted to inject more hydrogen as the engine operates at part-load, at a ratio that is lower than the initial HDR at startup but higher than the HDR during idling. The engine temperature remains near the optimal operating temperature and the AFR remains uniform and above stoichiometry, Engine speed increases. The alternator/generator operates opportunistically as an alternator during periods where excess power can be harvested and stored.

At t5, the notch lever position is further increased, such as to notch 7, requesting additional power from the engine. Engine load, engine temperature and engine speed increase. The HDR is decreased to a similar level as during idling. The AFR increases to be more lean.

While adjustments to engine speed and load are described to occur in response to changes in notch lever position in graph 600, other examples may alternatively include changes to engine speed and load in response other means of indicating requests for engine power. For example, in an engine configured for vehicle that is not a locomotive, modifications to engine operating parameters may occur based on time and power demand, such as actuation of an accelerator or throttle pedal.

In this way, combustion efficiency of an engine may be increased and/or unburned hydrocarbon or greenhouse gas emissions may be decreased during startup. The engine may be a dual fuel engine, configured to combust hydrogen and diesel. During cold engine starts, a fuel mixture injected at the engine may have an increased proportion of hydrogen relative to diesel, compared to combustion during other operating conditions, e.g., steady state and transient events. By injecting a higher proportion of hydrogen, less unburned diesel is emitted. As engine speed reaches an idling speed and the engine is able to efficiently burn the diesel such that unburned diesel emissions are maintained low, the proportion of injected hydrogen may be decreased, particularly when the hydrogen is pre-mixed, and the proportion of injected diesel may be increased to reduce an efficiency penalty resulting from unburned hydrogen and. As a result, engine startup is expedited and emissions are decreased during startup.

The technical effect of adjusting an injected fuel mixture during engine startup in response to engine speed and temperature is that engine speed is accelerated from standstill to idling with decreased carbon emissions and increased robustness to initial engine temperature and AFRs.

As used herein, an element or step recited in the singular and preceded with the word "a" or "an" do not exclude plural of said elements or steps, unless such exclusion is indicated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

As used herein, the term "approximately" is means plus or minus five percent of a given value or range unless otherwise indicated.

The disclosure also provides support for a method for an engine, comprising: starting an engine by injecting a fuel mixture with a proportion of a first fuel to a second fuel, the first fuel a non-hydrocarbon-based fuel and the second fuel a hydrocarbon-based fuel, and decreasing the proportion of the first fuel to the second fuel in the injected fuel mixture thereafter. In a first example of the method, injecting the fuel mixture includes injecting the fuel mixture responsive to detection of a request for the engine to start, and wherein decreasing the proportion of the first fuel to the second fuel includes decreasing the proportion responsive to engine speed reaching an idling speed. In a second example of the method, optionally including the first example, injecting the fuel mixture includes injecting a mixture of hydrogen and diesel at the engine and wherein the engine is a dual fuel engine. In a third example of the method, optionally including one or both of the first and second examples, the method further comprises: cranking the engine with an alternator/generator prior to injecting the fuel mixture. In a fourth example of the method, optionally including one or more or each of the first through third examples, injecting the fuel mixture responsive to detection of the request for the engine to start includes initiating fuel injection after the engine is cranked with the alternator/generator and the engine reaches a threshold speed, the threshold speed lower than the idling speed. In a fifth example of the method, optionally including one or more or each of the first through fourth examples, injecting the fuel mixture with the proportion of the first fuel to the second fuel includes injecting the fuel mixture when the engine reaches the threshold speed and wherein the threshold speed is a speed at which fuel injection is able to sustain the speed. In a sixth example of the method, optionally including one or more or each of the first through fifth examples, injecting the fuel mixture with the proportion of the first fuel to the second fuel includes injecting the fuel mixture with a first fuel to second fuel ratio of between 1:1 to 9:1. In a seventh example of the method, optionally including one or more or each of the first through sixth examples, injecting the fuel mixture with the proportion of the first fuel to the second fuel includes increasing an energy content of the first fuel to be equal to or greater than an energy content of the second fuel in the injected fuel mixture. In an eighth example of the method, optionally including one or more or each of the first through seventh examples, decreasing the proportion of the first fuel to the second fuel in the injected fuel mixture includes increasing an energy content of the second fuel to be greater than an energy content of the first fuel in the injected fuel mixture. In a ninth example of the method, optionally including one or more or each of the first through eighth examples, injecting the fuel mixture responsive to detection of the request for the engine to start includes determining if a temperature of the engine is lower than an optimal operating temperature of the engine. In a tenth example of the method, optionally including one or more or each of the first through ninth examples, injecting the fuel mixture responsive to detection of the request for the engine to start includes injecting the fuel mixture at a higher proportion of the first fuel to the second fuel when the engine is lower than the optimal operating temperature of the engine and injecting the fuel mixture at a lower proportion of the first fuel to the second fuel when the engine is at or higher than the optimal operating temperature of the engine.

The disclosure also provides support for an engine system for a vehicle, comprising: an engine configured to combust more than one type of fuel, an alternator/generator mechanically coupled to the engine, a first fuel storage reservoir coupled to the engine and configured to deliver a first fuel to the engine for combustion, a second fuel storage reservoir coupled to the engine and configured to deliver a second fuel to the engine for combustion, and a controller configured with executable instructions stored on non-transitory memory that, when executed, cause the controller to, crank the engine using the alternator/generator in response to detection of a cold start request and initiate fuel injection with a first ratio of the first fuel to the second fuel when an engine parameter reaches a first threshold, adjust the fuel injection to a second ratio of the first fuel to the second fuel when the engine parameter reaches a second threshold, the second ratio lower than the first ratio, and adjust the fuel injection to a third ratio of the first fuel to the second fuel, the third ratio higher than the second ratio when operation of the engine at part-load is requested. In a first example of the system, the first fuel is hydrogen and the second fuel is diesel and wherein the engine is configured to receive each of the first fuel and the second fuel by one of port injection, direct injection, and central manifold injection. In a second example of the system, optionally including the first example, the engine parameter is one or more of engine speed, engine temperature, coolant temperature, oil temperature, and exhaust temperature and wherein the first threshold is a threshold of the respective engine parameter indicating engine operation is sustainable by fuel combustion. In a third example of the system, optionally including one or both of the first and second examples, the second threshold is a threshold of the respective engine parameter indicating an idling mode of the engine. In a fourth example of the system, optionally including one or more or each of the first through third examples, the first ratio of the first fuel to the second fuel includes an amount of the second fuel for seeding ignition and wherein the amount of the second fuel is entirely combusted at the engine.

The disclosure also provides support for a method for a cold engine start, comprising: cranking an engine using a starting device, injecting hydrogen and diesel at the engine at a first hydrogen to diesel injection ratio in response to engine speed reaching a first threshold, and deactivating the starting device, decreasing injection of hydrogen to a second hydrogen to diesel injection ratio in response to an engine parameter reaching a second threshold, increasing injection of hydrogen to a third hydrogen to diesel injection ratio in response to a request for engine operation at part-load, and wherein injecting hydrogen and diesel at the high hydrogen to diesel injection ratio includes decreasing emission of unburned diesel during the cold engine start. In a first example of the method, decreasing the injection of hydrogen in response to the engine parameter reaching the second threshold includes decreasing the injection of hydrogen in response to the engine speed reaching an idling speed. In a second example of the method, optionally including the first example, decreasing the injection of hydrogen in response to the engine parameter reaching the second threshold includes decreasing the injection of hydrogen in response to a period of time elapsed since initiating fuel injection reaching the second threshold, and wherein the second threshold is a duration of time for an amount of injected fuel to be similar to a corresponding amount of combusted fuel. In a third example of the method, optionally including one or both of the first and second examples, increasing injection of hydrogen to the third hydrogen to diesel injection ratio includes increasing an amount of injected hydrogen relative to injected diesel to a ratio that is lower than the first hydrogen to diesel injection ratio.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system should take. This may be useful for balancing competing constraints on the engine. During operation of one embodiment, a determination can occur by processing the inputs through the parameters of the neural network to generate a value at the output node designating that action as the desired action. This action may translate into a signal that causes the engine to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

This written description uses examples to disclose the invention, including the best mode, and also to enable a person of ordinary skill in the relevant art to practice the invention, including making and using devices or systems and performing the incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An engine system for a vehicle, comprising:
an engine configured to combust more than one type of fuel;
an alternator/generator mechanically coupled to the engine;
a first fuel storage reservoir coupled to the engine and configured to deliver a first fuel to the engine for combustion;
a second fuel storage reservoir coupled to the engine and configured to deliver a second fuel to the engine for combustion; and a controller configured with executable instructions stored on non-transitory memory that, when executed, cause the controller to;
  crank the engine using the alternator/generator in response to detection of a cold start request and initiate fuel injection via fuel injectors with a first ratio of the first fuel to the second fuel when an engine speed reaches an engine speed threshold;
  adjust the fuel injection to a second ratio of the first fuel to the second fuel when the engine speed reaches an idling speed, the second ratio lower than the first ratio; and
  adjust the fuel injection to a third ratio of the first fuel to the second fuel when operation of the engine at part-load is requested, the third ratio higher than the second ratio and lower than the first ratio.

2. The engine system of claim 1, wherein the first fuel is hydrogen and the second fuel is diesel and wherein the engine is configured to receive each of the first fuel and the second fuel by one of port injection, direct injection, and central manifold injection.

3. The engine system of claim 1, wherein the engine parameter is one or more of engine speed, engine temperature, coolant temperature, oil temperature, and exhaust temperature and wherein the engine speed threshold is a threshold of the engine speed indicating engine operation is sustainable by fuel combustion.

4. The engine system of claim 3, wherein the second threshold is a threshold of the respective engine parameter indicating an idling mode of the engine.

5. The engine system of claim 1, wherein the first ratio of the first fuel to the second fuel includes an amount of the second fuel for seeding ignition and wherein the amount of the second fuel is entirely combusted at the engine.

* * * * *